United States Patent [19]

Kanatani

[11] Patent Number: 4,488,150
[45] Date of Patent: Dec. 11, 1984

[54] DRIVE CIRCUIT FOR VIDEO DISPLAY PANEL

[75] Inventor: Yoshiharu Kanatani, Tenri, Japan

[73] Assignee: Sharp Corporation, Osaka, Japan

[21] Appl. No.: 508,414

[22] Filed: Jun. 28, 1983

Related U.S. Application Data

[63] Continuation of Ser. No. 166,913, Jul. 8, 1980, abandoned.

[30] Foreign Application Priority Data

Feb. 26, 1980 [JP] Japan .................................. 55-23898
Mar. 11, 1980 [JP] Japan .................................. 55-31132

[51] Int. Cl.³ .............................................. G09G 3/12
[52] U.S. Cl. .................................... 340/781; 340/793; 340/825.81
[58] Field of Search .................. 340/781, 825.81, 805, 340/793

[56] References Cited

U.S. PATENT DOCUMENTS

| | | | |
|---|---|---|---|
| 3,723,749 | 3/1973 | Shapiro | 340/784 |
| 3,794,990 | 2/1974 | Kishimoto | 340/811 |
| 4,087,792 | 5/1978 | Asars | 340/166 EL |
| 4,110,662 | 8/1978 | Greeneich et al. | 340/793 |
| 4,134,132 | 1/1979 | Magos et al. | 340/793 |
| 4,237,456 | 12/1980 | Kanatani | 340/166 EL |
| 4,251,755 | 2/1981 | Bryden | 340/793 |
| 4,255,238 | 3/1981 | Delapierre et al. | 340/793 |

Primary Examiner—Marshall M. Curtis
Attorney, Agent, or Firm—Birch, Stewart, Kolasch & Birch

[57] ABSTRACT

There is disclosed an image display device including a thin film EL element with crossing scan electrodes and data electrodes, a modulation circuit for applying data pulses of a varying amplitude to the respective ones of the data electrodes, and a scan circuit for applying pulses of a fixed amplitude to the respective ones of the scan electrodes. The data pulses are supplied to the data electrodes via voltage follower drive stages which form part of the modulation circuit. Preferably, the data signals are digital-to-analog converted and held in a memory circuit for a while. Upon application of stepwise waveform signals in the memory circuit the data signals are thereafter digital-to-analog converted. The resulting analog amplitude from the digital-to-analog conversion is temporarily held in a gate capacitance and supplied to the EL element via the voltage follower drive stage.

3 Claims, 8 Drawing Figures (A)

DRIVE CIRCUIT FOR VIDEO DISPLAY PANEL

This application is a continuation of application Ser. No. 166,913 filed on July 8, 1980 now abandoned.

BACKGROUND OF THE INVENTION

This invention relates to a video display panel driven with relatively high voltage and more particularly to a display using a capacitive flat matrix display panel as an electroluminescent panel (called hereinafter "thin film EL panel").

A typical example of capacitive flat matrix display panels is a thin film EL panel and the following description is directed toward the thin film EL panel for the sake of illustration only.

As disclosed and illustrated in U.S. Pat. No. 3,975,661, DRIVING METHOD FOR A THIN-FILM ELECTROLUMINESCENT ELEMENT OF A THREE-LAYER CONSTRUCTION, assigned to the same assignee as this application, a representative thin film EL display panel has a three-layered structure shown in a perspective view partly in cross section in FIG. 1, the disclosure of which is incorporated herein. A predetermined number of transparent electrode strips 2 are disposed on a glass support 1. Further, a layer 3 of dielectric material such as $Y_2O_3$, $Si_3N_4$, $TiO_2$ and $Al_2O_3$, a layer 4 of electroluminescent material, for example ZnS doped with Mn (yellowish orange light) and a second layer 3 of dielectric material such as $Y_2O_3$, $Si_3N_4$, $TiO_2$, $Al_2O_3$ are disposed by a well known thin film technique such as vacuum deposition and sputtering, each having a thickness ranging from 500 to 10000 Å. This results in a double-isolation three-layered structure of the EL display panel. A different family of strip electrodes 5 is disposed in a direction normal to the transparent electrodes 2 to form an electrode matrix array together with the transparent electrodes. With such a three-layered thin film EL display panel, if one of the electrodes 2 in the first family and one of the electrodes 5 in the second family are selected, the minute area where the selected ones of the electrodes cross will emit light. This corresponds to a picture element of an image like a character, a symbol or a pattern to be displayed. The above described type of the EL panel is more attractive than the prior art dispersed powder type EL panel from standpoints of light intensity, working life and performance stability.

For displaying by use of the thin film EL panel, an individual drive circuit is needed for each of the respective electrodes whatever character, graph or image is desired to appear on the panel. The use of discrete elements in the buildup of the drive circuits attaches an increased number of components, complicated interconnections between the components and thereby noise. The number of circuit nodes to be adjusted is increased and fluctuations in the operating properties of the discrete elements would cause undesirable varied and uneven image quality. In order to display continuously varying and half-tone images like TV images, it is necessary to convert such analog signals as TV transmission signals into digital signals compatible with a drive circuit for the thin film EL panel. Mainly because thin film EL panel requires a considerably high light emitting voltage, drive elements must be high breakdown voltage elements. The prior art drive circuit employs as MOS integrated circuit in which gate voltage is converted into drain current for modulation purposes. However, such an IC suffers from the disadvantages that deviations in mutual conductance gm and gate-to-source threshold voltage are prejudicial to modulation operation.

OBJECTS AND SUMMARY OF THE INVENTION

Accordingly, it is an object of the present invention to provide an improved image display which is free of the above discussed disadvantages.

It is another object of the present invention to provide an image display drive circuit which allows high voltage noise-free driving without uneven image quality.

According to the present invention, there is provided an image display device comprising a thin film EL element with crossing scan electrodes and data electrodes, a modulation circuit for applying data pulses of a varying amplitude to the respective ones of said data electrodes, and a scan circuit for applying pulses of a fixed amplitude to the respective ones of said scan electrodes, wherein said modulation circuit further comprises voltage follower drive stages through which said data pulses are supplied to said data electrodes. In one of preferred forms of the present invention, said data signals are digital-to-analog converted and held in a memory circuit for a while. Upon subsequent application of stepwise waveform signals the signals in the memory circuit are digital-to-analog converted. The resulting analog amplitude from the digital-to-analog conversion is temporarily held in gate capacitance and finally supplied to the EL element via said voltage follower stages.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings in which like reference numbers designate like parts throughout the figures thereof, and wherein.

DETAILED DESCRIPTION OF THE INVENTION

Figure 2:
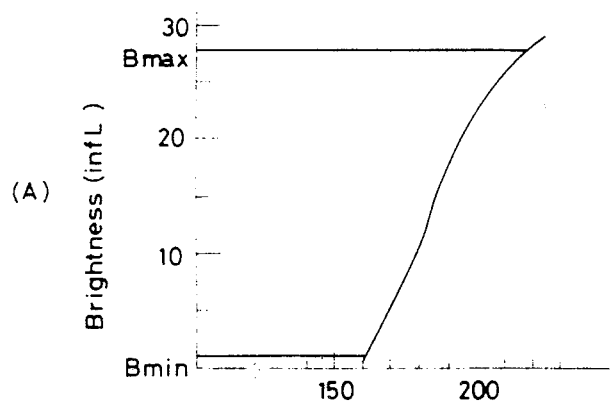
FIG. 2 is a graph for explanation of modulation characteristics of the thin film EL display panel.
Figure 2:
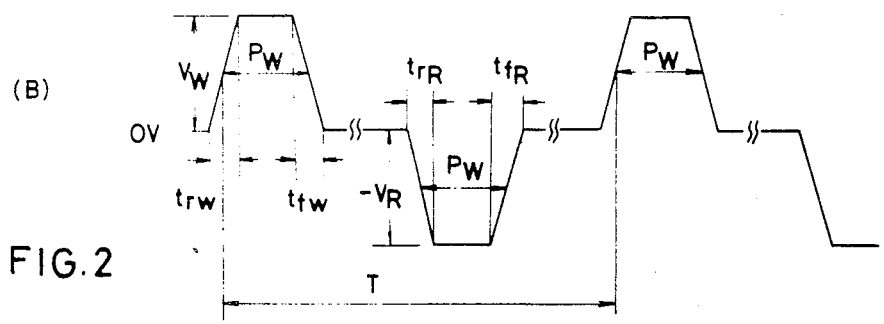

Referring now to FIGS. 2(A) and 2(B), there is illustrated modulation operation on the above discussed thin film EL display panel. When an illustrative voltage waveform of FIG. 2(B) is applied across the opposing electrodes of the thin film EL display panel, the panel exhibits the brightness versus voltage characteristics as depicted in FIG. 2(A). In other words, upon applying alternating pulses having a fixed amplitude $-V_R$ (say, $-190$ volts) in one polarity and a varying amplitude $V_W$ in the opposite polarity to the EL display panel, the brightness increases with an increase in the varying amplitude $V_W$. Thus, $V_W$ can serve as a write pulse and $-V_R$ as a refresh pulse. In the characteristic graph of FIG. 2(A), $V_R=190$ volts, the recurrent cycle T=16.7 m sec, the half width $P_W=35$ μsec, the rising and falling times $t_{rw}$, $t_{fw}$, $t_{rr}$ and $t_{rf}=6$ μsec$-8$ μsec. The characteristic curve demonstrates a substantially linear relationship between the light emission threshold voltage $V_T=160$ volts and the maximum voltage $V_W$ (max)=220 volts. The threshold brightness B (min) 1 fL when $V_W=V_T=160$ volts and the maximum brigthness B (max)=28 fL with $V_W=220$ volts.

Within a pulse modulation span $V_M=V_W$ (max)$-V_T=60$ volts, it is possible to provide a halftone image if amplitude modulation of $V_T+V_M$ (greater than $V_T$) is carried out. The fixed amplitude, on the other hand, is determined at $-V_R=-(V_T+V_M/2)$. This determination is intended to enhance degree of symmetry R (%) of the waveform of an alternating voltage applied to the display panel and avoid damage to the panel due to asymetric driving, aiming at a highly reliable image display.

$$R(\%)=V_W/V_R$$

$$[V_T/(V_T+V_M/2)] \leq R \leq [(V_T+V_M)/(V_T+V_M/2)]$$

Inserting the above values into the preceding equation, $$84\% < R < 116\%$$

In other words, the display panel is enabled with a maximum of 16% asymmetry with regard to the fixed amplitude $V_R$.

Figure 1:
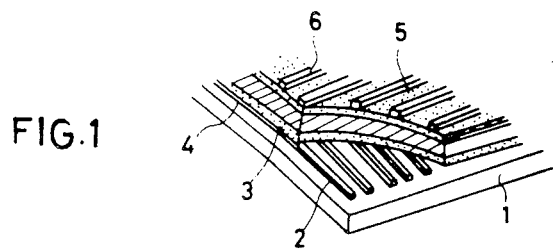
FIG. 1 is a perspective view partly in cross section of a thin film EL display panel.

In enabling the matrix type thin film EL panel of FIG. 1, the write operation is executed in a line scanning manner with the varying amplitude $V_W$ ($V_T \leq V_W < V_T+V_M$), and then the refresh pulse of the amplitude $-V_R$ is supplied throughout the panel after one-field scanning is over. The line scanning method is adapted due to lack of the satisfactory response property of the thin film EL panel of FIG. 1 which is suitable for the dot-scanning method. It is essential for the line scanning method to hold video signals during a particular complete horizontal scanning period and supply the same to the family of the electrodes at a time.

The present invention provides an effective and powerful measure of driving an image display using the above mentioned thin film EL panel in the line scanning fashion without nonuniformity in modulation operation.

Figure 3:
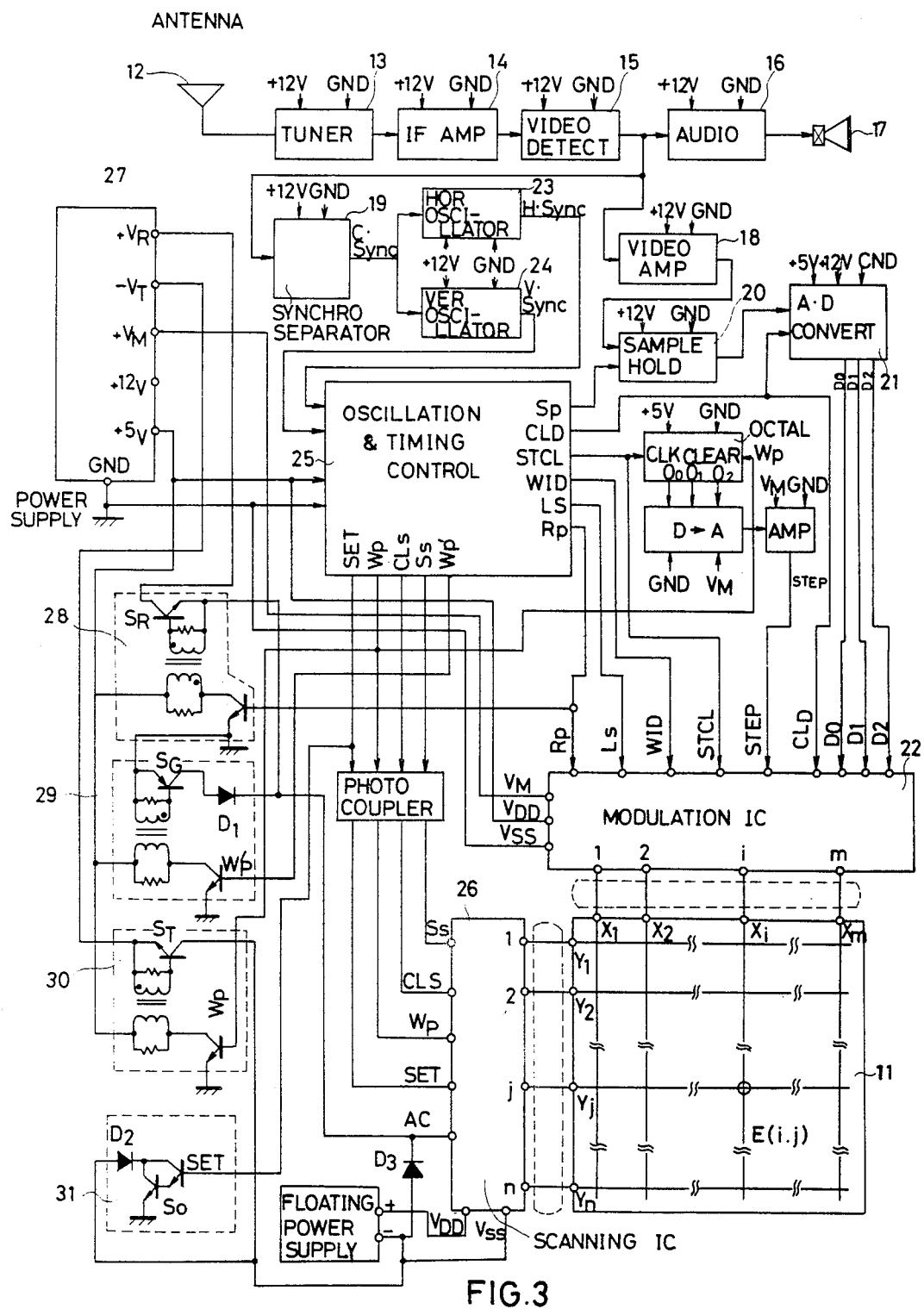
FIG. 3 is a schematic block diagram of an image display drive circuit according to one preferred form of the present invention.
Figure 4:
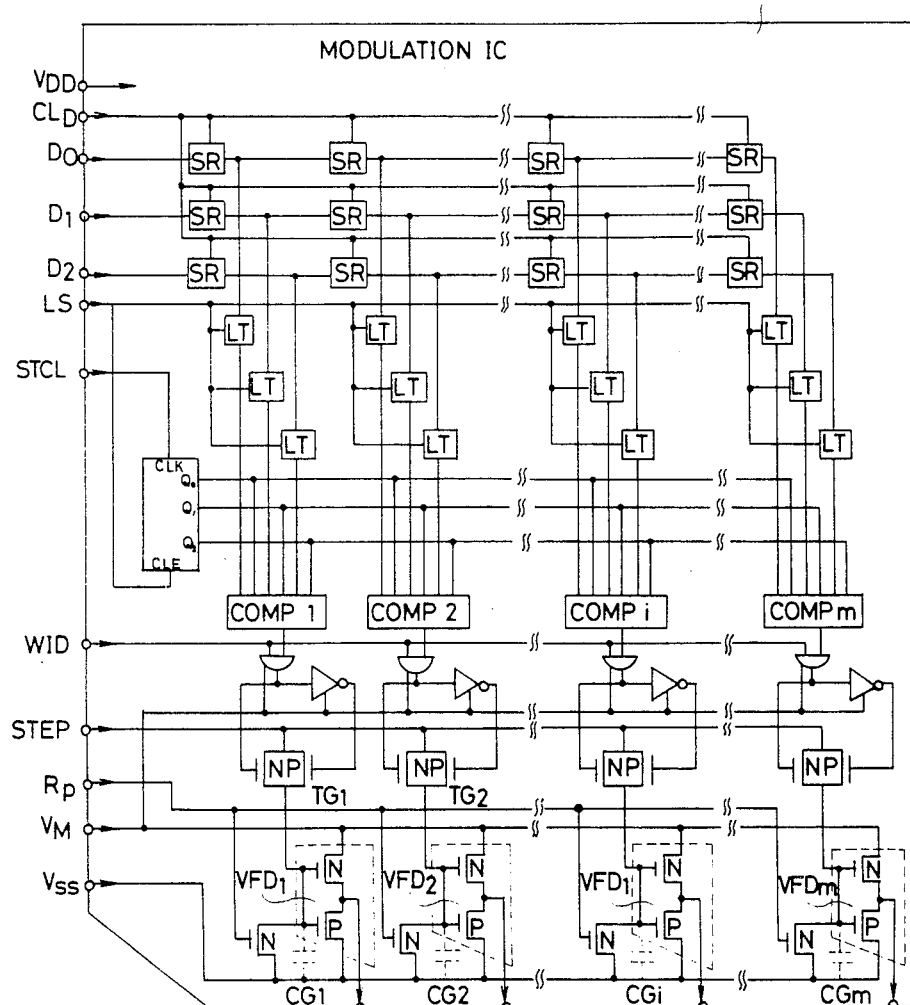
FIG. 4 is a wiring diagram of a modulation IC and a scanning IC, including the thin film EL display panel.
Figure 4:
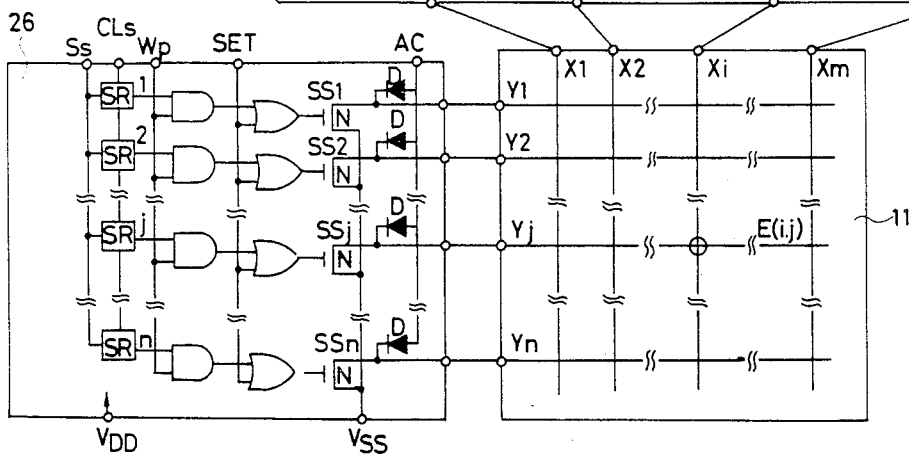

FIG. 3 shows a schematic block diagram of a drive circuit for the thin film EL panel according to one preferred form of the present invention. FIG. 4 is a wiring diagram of a modulation IC, a scanning IC and its peripheral circuit. In FIG. 3, the thin film EL panel 11 is only shown as having a matrix electrode structure. It is obvious that respective electrode terminals are connected to the drive circuit through connection leads as depicted in the broken lines.

TV composite signals coming via a tuner 13, an intermediate frequency amplifier 14 and a video detector 15 from an antenna 12 are classified into audio signals led into an audio circuit 16 and a loud speaker 17 and video signals led into a video amplifier 18 and a synchronous separator 19. The output of the video amplifier 18 is supplied as the video signal via a sample hold circuit 20 and an analog-to-digital converter 21 to the modulation IC 22. The output of the synchronous separator 19 sweeps separately into a horizontal oscillator 23 and a vertical oscillator 24, reaching the modulation IC 22 and the scanning IC 26 via an oscillation and timing control 25. A power supply 27 feeds desired supply voltages to a refresh circuit 28, a write reset circuit 29, a write drive circuit 30 and a refresh reset circuit 31. The modulation IC 22 provides the video amplitudes for the first family of the electrodes $X_i$ (i=1,2, ... m) after temporary holding, whereas the scanning IC 26 scans in sequence the second family of the electrodes $Y_j$ (j=1,2, ... n).

FIG. 4 shows in more detail the modulation IC 20 by which binary codes indicative of the video amplitudes are stored and, subsequent to conversion from the binary codes to correspondingly modulated amplitudes, the modulated amplitudes are applied to the first electrode family $X_i$ (i=1,2, ... m), and the scanning IC 24 by which the second electrode family $Y_j$ (j=1,2, ... n) are sequentially scanned, together with the matrix panel to be driven. The binary codes $D_0$ (LSB), $D_1$ and $D_2$ (MSB) of three bits long are applied in parallel to the modulation IC 20 and parallel transferred to serially connected shift registers SR synchronous with a shift data clock CLD. At the end of a series of the video signals during a particular complete horizontal interval or the beginning of a succeeding blanking period a latch strobe pulse LS is applied to all latched LT to transfer and hold these video signals in the respective shift registers SR.

Figure 5:
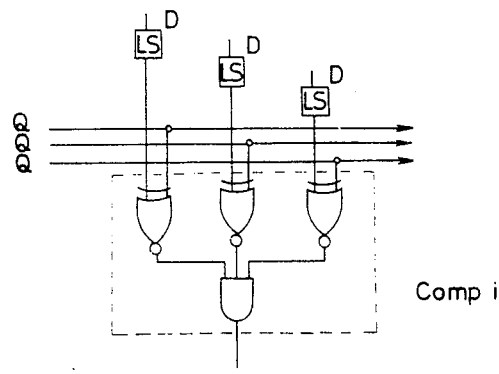
FIG. 5 is a circuit diagram of an example of a digital comparator.
Figure 6:
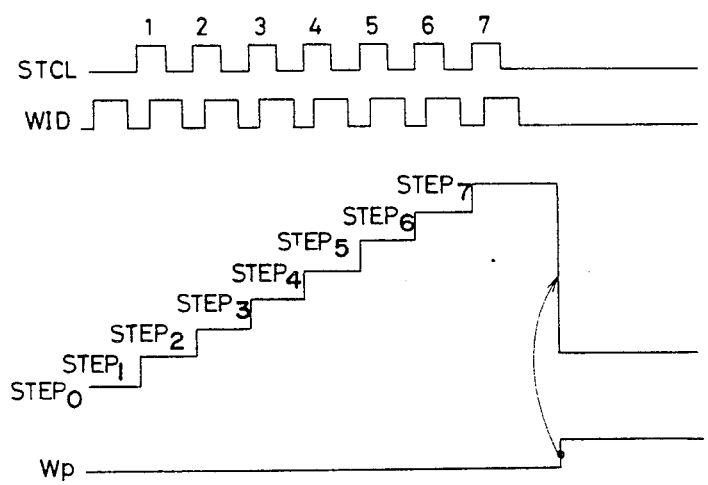
FIG. 6 is an explanation diagram showing the relationship between clock signals and stepwise input signals.

The three bit binary codes in the respective latches are subject to amplitude modulation. After application of the latch strobe pulse a clock STCL is supplied to a clock input CLK of an octal counter OCTAL within the modulation IC. Since the latch strobe pulse LS has been applied to a clear input CLE of this counter in advance, the output states $Q_0$ (LSB), $Q_1$ and $Q_2$ (MSB) are all in the state $\emptyset$. The output states ($Q_0$, $Q_1$ and $Q_2$) are incremented progressively in the order of (1, $\emptyset$, $\emptyset$), ($\emptyset$, 1, $\emptyset$), ... (1, 1, 1) in response to repeated application of the clock STCL. A digital comparator $COMP_i$ (i=1, 2, ... m) receives the contents of the three bit latches ($D_0$, $D_1$, $D_2$) and the output ($Q_0$, $Q_1$, $Q_2$) of the counters and, only if the both are in agreement, provides a logic output "1". It will be noted that a typical example of the comparator $COMP_i$ is illustrated in FIG. 5. At the same time the clock CLK is applied to the clock inpt CLK of the OCTAL counter external to the modulation IC of FIG. 3 to thereby increment the OCTAL counter in synchronism with the counter within the modulation IC. Digital-to-analog conversion of the counter outputs $O_0$ (LSB), $O_1$ and $O_2$ results in developing an eight-step waveform which in turn is eventually led to input terminals of the modulation IC 22. The relationship between the clock and the resulting stepwise waveform is depicted in FIG. 6 wherein a window pulse is labeld WID.

Logical products of the respective outputs of the comparators $COMP_i$ (i=1, 2, ... m) and the window pulse WID are operatively coupled with the gates of bidirectional transfer gates $TG_i$ (i=1, 2, ... m). When the data within the latches $D_0$, $D_1$ and $D_2$ are in exact agreement with the outputs ($O_0$, $O_1$ and $O_2$), namely, the corresponding stepwise amplitudes, the transfer gates are placed into the ON state which allows the gates of respective voltage follower drive stages VFD$_i$ (i=1, 2, ... m) to receive those stepwise amplitudes during the presence of the window pulse WID. It is understood that each of the voltage follower drive stages is of a conventional CMOS structure.

The thus transferred amplitudes are held by the gate capacitance (as denoted by the dot lines) of each of the gate inputs of the respective drive stages. The window pulse WID is wider than the step input in order to place the transfer gates into the ON state in response to only a stable stepwise waveform. The amplitudes after transmission and holding are outputted from the voltage follower drive stages and supplied to modulate the first family of the electrodes X$_i$ (i=1, 2, ... m) according to the respective stepwise amplitudes.

Figure 7:
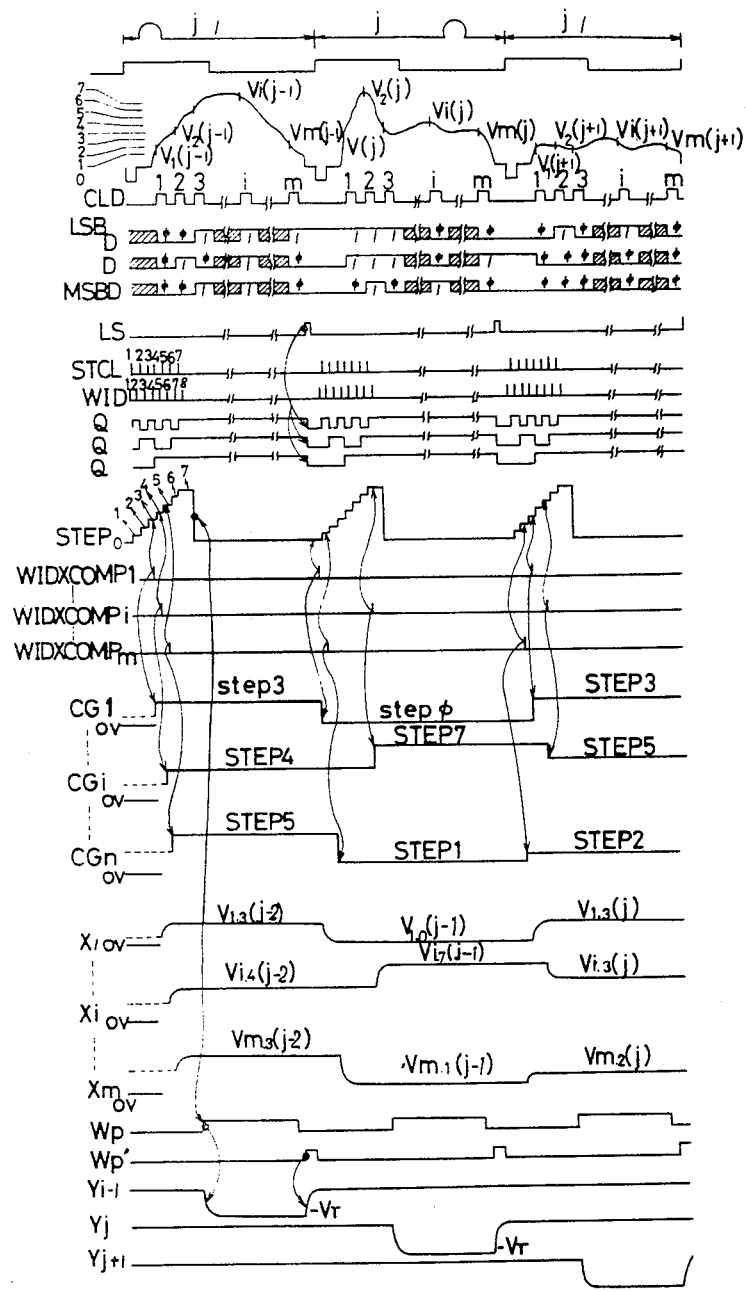
FIG. 7 is a timing chart showing modulation operation according to the present invention.

FIG. 7 is a timing chart with regard to the modulation operation. Following analog-to-digital conversion of a particular video amplitude V$_i$(j) during a particular or the (j) th horizontal interval, the video amplitude is digital-to-analog converted into the amplitude step k in the above mentioned manner. The amplitude outputted via the drive stages is labeled v$_i$, k (j).

The drive circuit proceeds with the write operation with the aid of the scanning IC 26, the write drive circuit 30 and the write reset circuit 29. Since 22 H (H SYNC) following a particular vertical synchronous signal V SYNC a shift clock CLS synchronous with shift data S$_S$ and a particular horizontal synchronous signal H SYNC is applied to the scanning IC 26, permitting the shift registers to derive shift pulses 1, 2, ... j, . . . n in sequence therefrom. A logical product of the outputs of the shift registers and a write pulse W$_P$ is evaluated and used to place switch stages SS$_1$, SS$_2$ . . . SS$_j$ . . . SS$_n$ sequentially into the ON state.

In FIG. 7, the (j) th video signal is analog-to-digital converted and upon completion of transmission, the binary data indicative of the amplitude information from the shift registers are held in the latches in reply to a latch strobe pulse LS. Upon application of a stepwise input the binary data are converted into one of the stepwise amplitudes such that the resulting modulated amplitudes V$_i$, k (i=1, 2, ... m) are applied respectively to the electrodes X$_i$ (i=1, 2, ... m). Under these circumstances the (j+1) th switch stage SS$_{j+1}$ within the scanning IC is in the ON state during the write pulse W$_P$. Simultaneously, the write pule W$_P$ is supplied to the write drive circuit 30, rendering a switch transistor S$_T$ so that the substrate of the scanning IC 26 together with the scan electrode Y$_{j+1}$ is pulled up to the supply voltage $-V_T$. The remaining scan electrodes are held unchanged. At this point logic circuitry in the scanning IC is enabled with a floating power supply 32, with various logic inputs being isolated from other signals via well known photocouplers. Accordingly, the write amplitude V$_{Wi(j+1)}$ on a particular picture element E (i, j+1) on a particular scan electrode Y$_{j+1}$ can be represented as follows:

$$V_{Wi(j+1)} = v_{i,k}(j) + V_T (i=1, 2, \ldots m)$$

Electroluminescence takes place according to the respective amplitudes. After the completion of the write operation a write recovery pulse W$_P'$ is supplied to the write reset circuit 29 to turn ON a switching transistor S$_G$ and raise a common line AC of the anodes of a diode array up to the ground potential GND. In other words, the electrode Y$_{j+1}$ is held at the ground potential. In this manner, the modulation operation and the write operation are carried out on the series of the video signal during the particular horizontal scanning interval.

The next succeeding video signal is converted from the binary code notation to ones of the respective step levels. While the modulation operation is effected on the electrodes X$_i$ (i=1, 2, ... m), followed by subsequent write operation, the instantaneous video signal during the (j+1)th horizontal interval is held and analog-to-digital converted and eventually sent to the shift registers in the modulation IC 22. The write operation comes into effect on the video during the (j+1) th horizontal interval while the counterpart during the (j+2) th horizontal interval is being analog-to-digital converted.

Upon completion of the write operation on the electrode Y$_n$ through repeated execution of the above described operations the refresh pulse R$_P$ is supplied to the modulation IC 22 of FIG. 4 during the vertical blanking interval, turning ON N-channel elements connected to the respective drive stages and clamping all of the electrodes X$_1$, X$_2$, ... X$_m$ with the ground potential (GND).

The refresh pulse R$_P$ applied to the refresh circuit 28 as indicated in FIG. 3 serves to place the switching transistor S$_R$ into the ON state and pull the anode common line AC of the diode array and thus all of the scan electrodes up to the supply voltage $+V_R$. While viewing from the scan electrode side, the electrodes can be regarded as being supplied with a negative pulse of the amplitude V$_R$. Accordingly, all of the picture elements are supplied with the amplitude of $-V_R$. After application of the refresh pulse R$_P$ a refresh reset pulse SET is fed into the refresh reset circuit 31 and the scanning IC 26, turning ON all of the switch stages SS$_1$, SS$_2$, ... SS$_n$ in the scanning IC 26 and lowering the substrate of the modulation IC to the ground level (the switching transistor S$_0$ is in the ON state). It follows that all of the scan electrodes are held down to the ground level.

Figure 8:
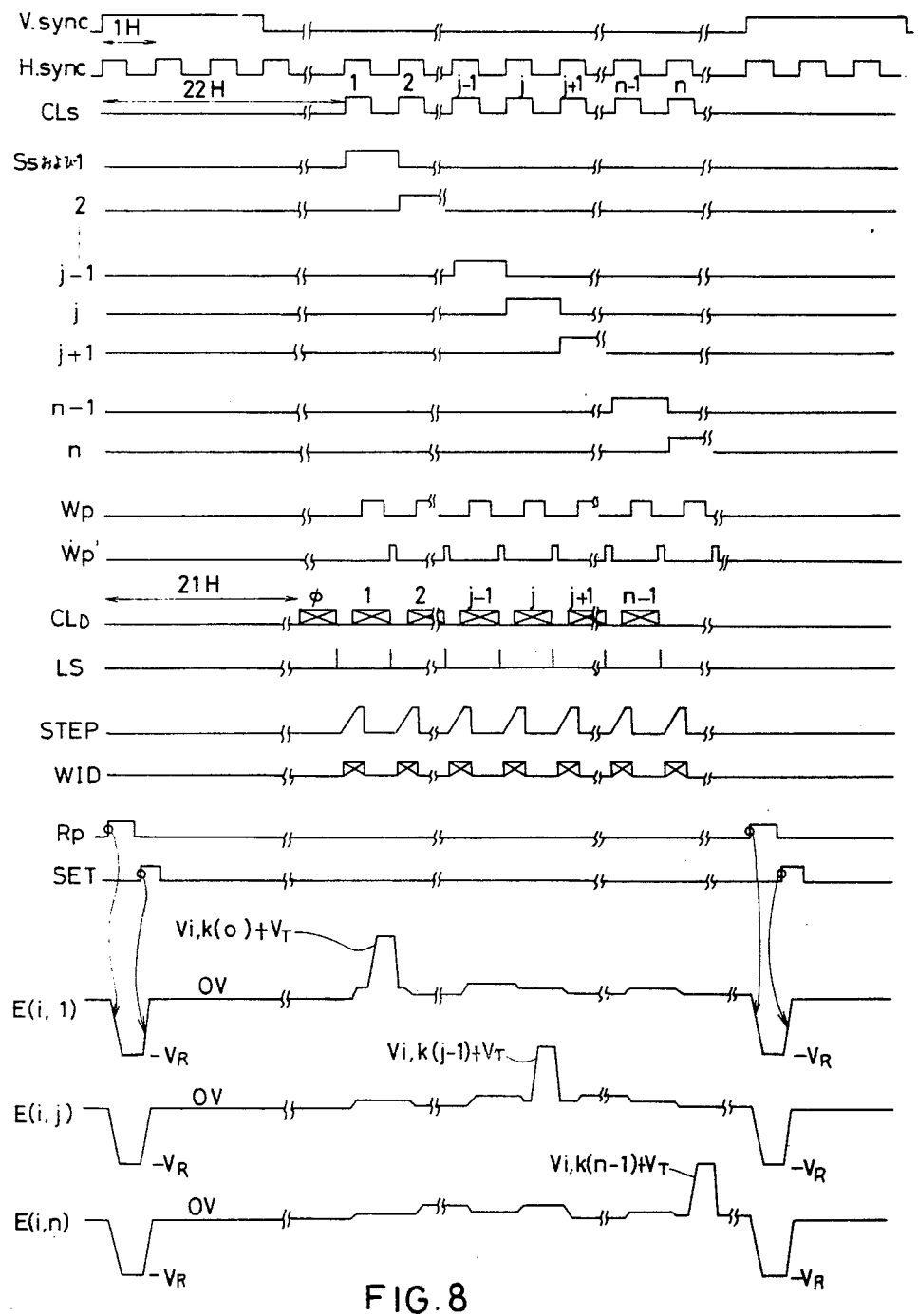
FIG. 8 is a waveform diagram of voltages developing across picture elements, in relation to write operation and refresh operation.

The above procedure accomplishes a full and complete cycle of the one-field display operation with AC enabling. FIG. 8 is a waveform diagram showing the relationship among the write operation, the refresh operation and the waveforms of the various signals developing across particular picture elements as denoted by E (i, l), E (i, j) and E (i, n).

The invention being thus described, it will be obvious that the same may be varied in many ways. Such modifications are not to be regarded as a departure from the spirit and scope of the invention, and all such modifications are intended to be included, within the scope of the following claim.

What is claimed is:
1. An image display device comprising:
electroluminescent matrix array display means for displaying half-tone images, said display means having crossing scan electrodes and data electrodes which form individual display elements at the intersections therebetween, each display element requiring the application of a voltage greater than a predetermined threshold voltage to vary the brightness of said display to greater than its minimum brightness;
means for providing a video signal to be displayed;
analog-to-digital conversion means for digitalizing the information contained in said video signal to form binary information;

memory means for temporarily storing the binary information produced by said analog to digital conversion means;

digital-to-conversion means responsive to said binary information stored in said memory means for producing discretely valued analog signals differing from the values of said video signal to produce a variation in display brightness substantially uniformly related to the values of said video signal while compensating for said predetermined threshold voltage;

means for applying said discretely valued analog signals to said data electrodes;

scan circuit means for producing and applying pulses to respective ones of said scan electrodes;

each picture element of said display means thereby producing a tone related to the information supplied on said video signal.

2. The device of claim 1 further comprising:

a voltage follower drive circuit disposed between said means for applying and said data electrodes, said voltage follower drive circuit having a gate capacitance for retaining said data pulses to maintain the associated said picture element of said array energized.

3. The device of claim 1 wherein said means for applying applys data pulses of only a first polarity to said data electrodes;

said scan circuit means applying fixed amplitude pulses of only a second polarity different from said first polarity to said scan electrodes.

* * * * *